(12) United States Patent
Guizilini

(10) Patent No.: US 12,541,887 B2
(45) Date of Patent: Feb. 3, 2026

(54) LEARNING PHOTOMETRIC ERROR AS A MEASURE OF UNCERTAINTY

(71) Applicant: Toyota Research Institute, Inc., Los Altos, CA (US)

(72) Inventor: Vitor Guizilini, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 670 days.

(21) Appl. No.: 17/719,909

(22) Filed: Apr. 13, 2022

(65) Prior Publication Data

US 2023/0334717 A1 Oct. 19, 2023

(51) Int. Cl.
*G06T 9/00* (2006.01)
*G06T 7/50* (2017.01)
*G06V 10/82* (2022.01)

(52) U.S. Cl.
CPC .............. *G06T 9/002* (2013.01); *G06T 7/50* (2017.01); *G06V 10/82* (2022.01); *G06T 2207/10028* (2013.01)

(58) Field of Classification Search
CPC . G06T 9/002; G06T 7/50; G06T 2207/10028; G06V 10/82
USPC ......................................................... 382/156
See application file for complete search history.

(56) References Cited

U.S. PATENT DOCUMENTS

| 10,237,530 B1* | 3/2019 | Brailovskiy ......... H04N 13/128 |
| 2021/0004976 A1* | 1/2021 | Guizilini ................. G06T 7/521 |

FOREIGN PATENT DOCUMENTS

| CN | 111310916 A | | 6/2020 | |
| CN | 112488104 A | * | 3/2021 | ............. G06F 18/24 |
| CN | 113330486 A | | 8/2021 | |
| WO | 02075656 A1 | | 9/2002 | |
| WO | 2019182974 A2 | | 9/2019 | |

OTHER PUBLICATIONS

IP.com.*
NPL: Results Publication Date Range: Mar. 15, 2018 to Sep. 10, 2025.*
SFM self-supervised depth estimation: breaking down the ideas (https://towardsdatascience.com/self-supervised-depth-estimation-breaking-down-the-ideas-f212e4f05ffa) Feb. 26, 2020.

* cited by examiner

*Primary Examiner* — Quang N Vo
(74) *Attorney, Agent, or Firm* — DINSMORE & SHOHL LLP

(57) ABSTRACT

A method may include receiving an image of a scene, inputting the image into a trained neural network, determining an estimated depth map for the image based on a first output of the neural network, the estimated depth map comprising a depth value for each pixel of the image, and determining a confidence level of the depth value for each pixel of the image based on a second output of the neural network.

17 Claims, 7 Drawing Sheets

LEARNING PHOTOMETRIC ERROR AS A MEASURE OF UNCERTAINTY

TECHNICAL FIELD

The present specification relates to creating a depth map for an image and more particularly to learning photometric error as a measure of uncertainty.

BACKGROUND

Depth estimation techniques may be used to obtain a representation of the spatial structure of a scene. In particular, depth estimation techniques may be used to obtain a depth map of a two-dimensional (2D) image of a scene comprising a measure of a distance of each pixel in the image from the camera that captured the image. While humans may be able to look at a 2D image and estimate depth of different features in the image, this can be a difficult task for a machine. However, depth estimation can be an important task for applications that rely on computer vision, such as autonomous vehicles.

A neural network may be trained to estimate depth values for an image. An image may then be captured and input into the trained network, which may output an estimated depth map for the image. However, the estimated depth map output by the trained network may have errors of varying degree. Accordingly, it may be useful if the network is able to output a predicted confidence level associated with each pixel of the depth map. This may allow downstream tasks that use the estimated depth map to determine how much the depth map can be trusted. Accordingly, a need exists for improved depth estimation techniques that are able to output a confidence level or a level of uncertainty associated with an estimated depth map.

SUMMARY

In one embodiment, a method may include receiving an image of a scene, inputting the image into a trained neural network, determining an estimated depth value for the image based on a first output of the neural network, the estimated depth map comprising a depth value for each pixel of the image, and determining a confidence level of the depth value for each pixel of the image based on a second output of the neural network.

In another embodiment, a method may include receiving training data comprising a plurality of training examples, each training example comprising a first image of a scene captured by a first camera from a first perspective, a second image of the scene captured by a second camera from a second perspective, and a geometric relationship between the first camera and the second camera, for each training example, using self-supervised learning techniques to determine ground truth depth values and a photometric error for each pixel of the first image based on the first image, the second image, and the geometric relationship between the first camera and the second camera, and training a neural network to receive an input image, output an estimated depth value for each pixel of the input image, and output a confidence level of the estimated depth value for each pixel of the input image based on the determined ground truth depth values and the determined photometric error, using supervised learning techniques.

In another embodiment, a computing device may include a controller programmed to receive an image of a scene, input the image into a trained neural network, determine an estimated depth map for the image based on a first output of the neural network, the estimated depth map comprising a depth value for each pixel of the image, and determine a confidence level of the depth value for each pixel of the image based on a second output of the neural network.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals and in which.

DETAILED DESCRIPTION

Figure 1:
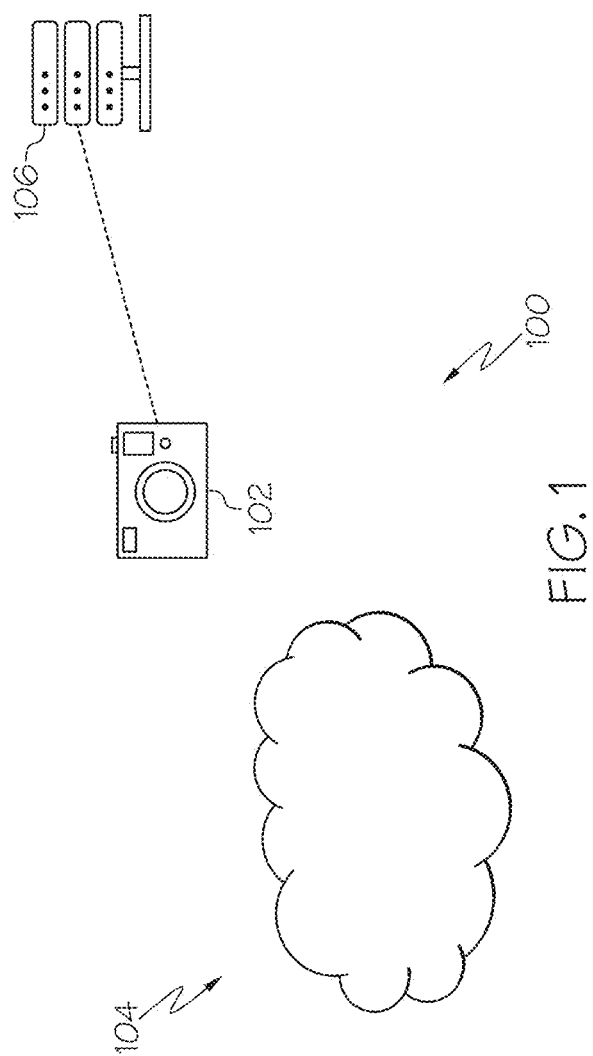
FIG. 1 schematically depicts a system for estimating a depth map for a captured image, according to one or more embodiments shown and described herein.

A neural network may be trained to receive an input 2D RGB image and output a depth map comprising estimated depth values for each pixel of the input image. For example, the neural network may be trained using training data comprising a large number of training images and ground truth depth maps associated with each image, wherein a ground truth depth map includes ground truth depth values for each pixel of an associated training image. The neural network may then be trained using supervised learning techniques. Once the neural network is trained, it may be used to produce estimated depth maps for captured images in real-time. For example, a camera of an autonomous vehicle may capture an image and input the captured image into the trained neural network. The neural network may then output an estimated depth map associated with the image, which the autonomous vehicle may use to make driving decisions.

However, the estimated depth map output by the trained neural network may not include accurate depth values for all of the pixels of the image. For example, certain portions of a captured image may have occlusions, shadows, motion, or other features or artifacts that make it more difficult for the neural network to accurately estimated depth values. Furthermore, it may be difficult to obtain ground truth depth values for captured images.

Accordingly, in embodiments disclosed herein, training data for a neural network may comprise a plurality of training examples, with each training example comprising a pair of images of a scene captured by a first camera and a second camera with a known geometric relationship between the cameras (e.g., a known location and orientation of each of the cameras with respect to the scene). One of the images of the scene may be used as a training image for the neural network. The other image of the scene may be used to obtain ground truth depth values for the training image using self-supervision, as disclosed herein.

In particular, because the two cameras each capture an image of the same scene from a different perspective, a given pixel in the image captured by the first camera will correspond to a particular pixel in the image captured by the second camera. However, the specific correspondence between pixels of the first image and pixels of the second image may vary depending on the depth of each pixel. For example, if a depth value of a pixel A in the image of the scene captured by the first camera is 20 meters, it may correspond to a particular pixel B in the image of the scene captured by the second camera. However, if the depth of the pixel A in the image of the scene captured by the first camera is 40 meters, it may correspond to a different pixel C in the image of the scene captured by the second camera.

As such, a depth estimation system may consider a plurality of potential depth values for each pixel in the image captured by the first camera. That is, the depth estimation system may assume a range of possible depth values for pixels in an image (e.g., 1 meter-100 meters) as potential depth values. The range of potential depth values may be set by a user of the depth estimation system. For each potential depth value for a given pixel in the image captured by the first camera, the system may determine a corresponding pixel in the image captured by the second camera, based on the known geometry between the two cameras. The system may then determine, for each potential depth value of a pixel in the image captured by the first camera, a data matching cost between the pixel in the image captured by the first camera and a determined corresponding pixel in the image captured by the second value (e.g., a difference in RGB values between the pixel in the image captured by the first camera and the corresponding pixel in the image captured by the second camera). Whichever potential depth value has the lowest data matching cost (e.g., the highest similarity) may be estimated to be the actual depth of the pixel. Accordingly, depth values of an image may be determined without explicit supervision using ground truth depth values, but rather based on self-supervision.

An estimated depth value may be determined using self-supervision, as described above, for each pixel of a training image. The estimated depth values for the pixels of a training image may then be used as ground truth depth values to training the neural network using supervised learning. In addition, the data matching cost for the potential depth value selected for each pixel of a training image may be identified as a photometric error or photometric loss for the pixel. The photometric error may indicate a confidence level in the accuracy of the estimated depth value (e.g., the lower the photometric error, the higher the confidence level). As such, the determined photometric error may be used as an additional ground truth value associated with each pixel of the training image.

Once the ground truth depth values and photometric error have been determined for a training image, the training image and determined ground truth values may be used as training data to train the neural network. In particular, the neural network may be trained, using supervised learning techniques, to receive an input image and to output an estimated depth value for each pixel of the input image, as well as an estimated photometric error for each pixel of the input image.

Once the neural network is trained, it may be used to determine a depth map for an image as well as an estimated photometric error for each pixel of the image, thereby indicating a confidence level associated with each depth value of the estimated depth map. Thus, when the neural network is used as part of another system (e.g., an autonomous vehicle), the system may make decisions based on not only the estimated depth map, but also the confidence level of different portions of the depth map.

For example, an autonomous vehicle may utilize the trained neural network to generate a depth map for an image captured by the autonomous vehicle. The autonomous vehicle may make driving decisions based on the determined depth map. However, if certain portions of the depth map have a low confidence level, the autonomous vehicle may refrain from taking certain driving actions due to the low confidence level. For example, if a portion of a captured image has depth values with low confidence levels, the autonomous vehicle may gather additional data before relying on the estimated depth values with low confidence levels to make driving decisions. As such, a system utilizing a depth estimation system as disclosed herein may make better use of an estimated depth map based on the confidence levels associated with the estimated depth map.

Turning now to the figures, FIG. 1 schematically depicts a system for performing depth estimation. In the example of FIG. 1, a system 100 includes a camera 102 that captures an image of a scene 104. In some examples, the camera 102 may be a stand-alone camera. In other examples, the camera 102 may be part of another system (e.g., an autonomous vehicle system). A server 106 may be communicatively coupled to the camera 102. In particular, the server 106 may receive an image captured by the camera 102. In some examples, the server 106 may be a remote computing device located remotely from the camera 102. In some examples, the server 106 may be a cloud computing device. In other examples, the server 106 may be a computing device located near the camera 102 and/or the scene 104.

After receiving an image from the camera 102, the server 106 may determine an estimated depth map for the received image, and an estimated photometric loss for each pixel of the depth map. The photometric error may indicate a confidence level or an uncertainty level associated with each depth value of the depth map. The server 106 may be trained to output the estimated depth map and values of photometric error associated with the depth map, as disclosed in further detail below.

Figure 2:
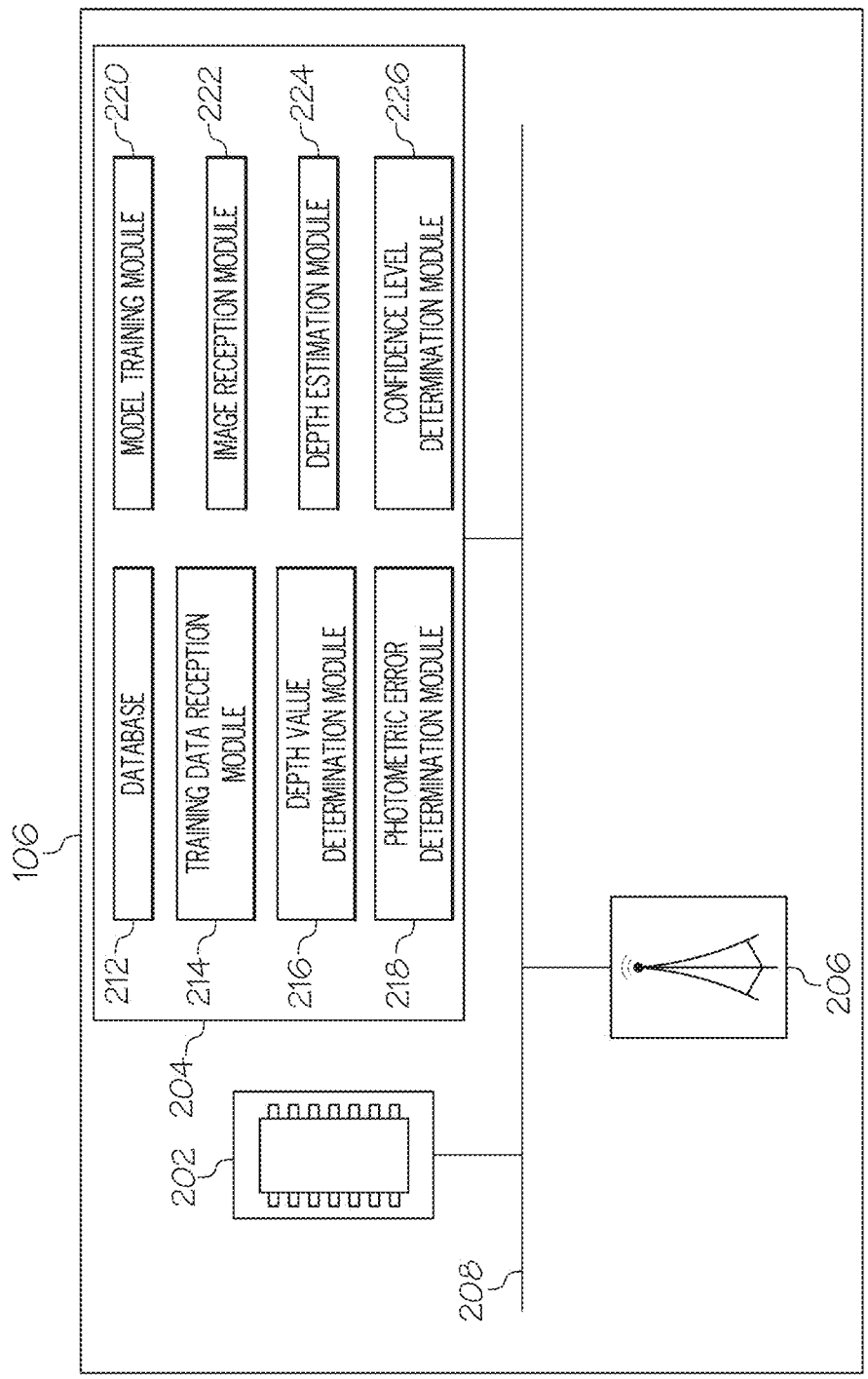
FIG. 2 depicts a schematic diagram of the server of FIG. 1, according to one or more embodiments shown and described herein.

Now referring to FIG. 2, the server 106 comprises one or more processors 202, one or more memory modules 204, network interface hardware 206, and a communication path 208. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202.

The network interface hardware 206 can be communicatively coupled to the communication path 208 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the server 106 may transmit and receive data to and from the camera 102 and/or other devices.

The one or more memory modules 204 include a database 212, a training data reception module 214, a depth value determination module 216, a photometric error determination module 218, a model training module 220, an image reception module 222, a depth estimation module 224, and a confidence level determination module 226. Each of the database 212, the training data reception module 214, the depth value determination module 216, the photometric error determination module 218, the model training module 220, the image reception module 222, the depth estimation module 224, and the confidence level determination module 226 may be a program module in the form of operating systems, application program modules, and other program modules stored in the one or more memory modules 204. In some embodiments, the program module may be stored in a remote storage device that may communicate with the server 106. Such a program module may include, but is not limited to, routines, subroutines, programs, objects, components, data structures and the like for performing specific tasks or executing specific data types as will be described below.

The database 212 may store data received from the camera 102 (e.g., captured images). The database 212 may also store parameters of a neural network maintained by the server 106, as disclosed herein. The database 212 may also store training data used to train the neural network as disclosed herein. The database 212 may also store other data used by the memory modules 204.

The training data reception module 214 may receive training data that may be used to train the neural network maintained by the server 106. As discussed above, the server 106 may maintain a neural network that may be trained to receive an image as an input and output an estimated depth map for the image, and an estimated photometric error for each pixel of the estimated depth map, as disclosed herein. The neural network may be trained using supervised learning techniques using training data comprising a plurality of training images along with ground truth depth values and ground truth photometric error values associated with the training images.

However, it may be difficult to directly obtain ground depth values and ground truth photometric error values. Accordingly, in embodiments, each training image received by the training data reception module 214 may be paired with a companion image of the same scene taken from a different perspective. That is, each training example received by the training data reception module 214 may comprise a training image of a scene captured by a first camera from a first perspective, as well as a companion image of the scene captured by a second camera from a second perspective.

Figure 3:
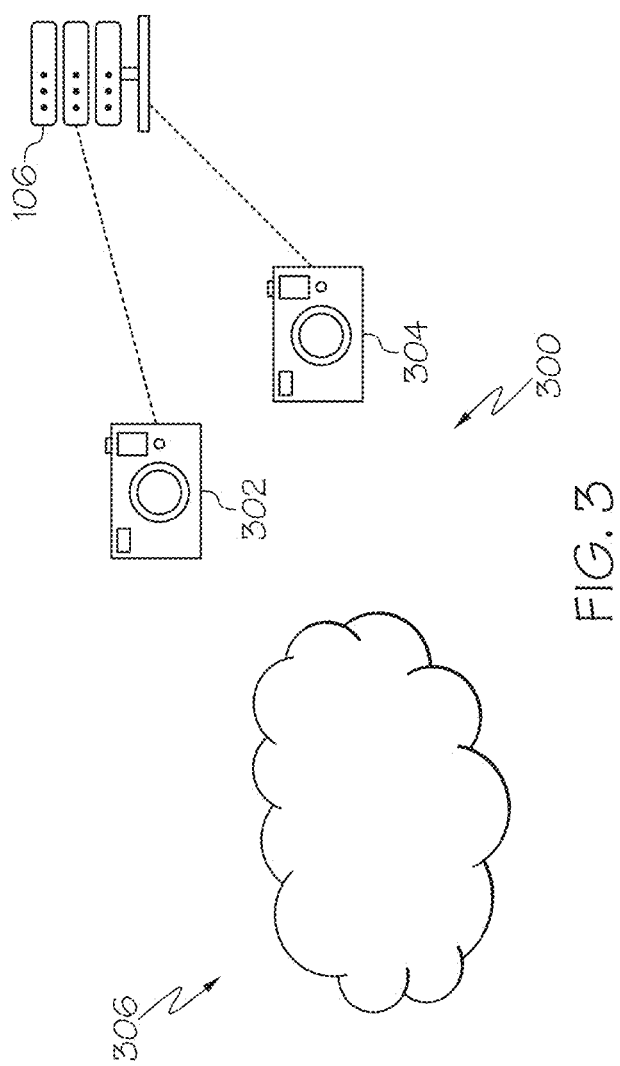
FIG. 3 schematically depicts a system for capturing training data for estimating a depth map, according to one or more embodiments shown and described herein.

For example, FIG. 3 shows a system 300 including a first camera 302 and a second camera 304. The first camera 302 and the second camera 304 may each capture an image of a scene 306 from a different perspective. The images captured by the cameras 302 and 304 may be transmitted to the server 106 as training data. For example, the image of the scene 306 captured by the first camera 302 may be treated as the training image and the image of the scene 306 captured by the second camera 304 may be treated as the companion image. The first and second cameras 302, 304 may also transmit their positions and orientations relative to the scene 306 to the server 106. As such, the training data reception module 214 may receive the training image, the companion image, and the geometric relationship between the first and second cameras 302, 304. Accordingly, the server 106 may utilize the received pair of images to determine ground truth depth values and ground truth photometric error values using self-supervision, as described in further detail below. After the ground truth values are determined, the server 106 may use the determined ground truth values to train the neural network using supervised learning techniques.

Referring back to FIG. 2, the depth value determination module 216 may determine ground truth depth values for a training image of a scene captured by a first camera and received by the training data reception module 214 based on a companion image of the scene captured by a second camera and based on a known geometric relationship between the first and second camera using self-supervision, as disclosed herein. In the illustrated example, the training image and the companion image received by the training data reception module 214 may comprise color images of a scene and each pixel of the captured images may have an RGB value. However, in other examples, the captured images may be grayscale images or other types of images, and each pixel of a captured image may have a value based on the type of the captured image.

Because a training image is a 2D image, the pixels of the image do not include depth values for the pixels of the image. As such, the depth value determination module 216 may create a depth map for the training image, using the techniques disclosed herein. As described above, the training data reception module 214 may receive data comprising a geometric relationship between the first camera that captures a training image of a scene (e.g., the first camera 302 of FIG. 3) and a second camera that captures a companion image of the scene (e.g., the second camera 304 of FIG. 3). In particular, as described above, the training data reception module 214 may receive camera geometry comprising a position of each of the cameras 302, 304, and an orientation of each the cameras 302, 304 with respect to the scene 306. For example, an orientation of the cameras 302, 304 may comprise an angle of lenses of the cameras 302, 304 with respect to the scene 306. In some examples, a geometric relationship between the cameras 302, 304 may be determined by determining a relative position and angle of rotation of the second camera 304 with respect to the first camera 302.

The depth value determination module 216 may transform a pixel of the training image captured by the first camera 302 to a pixel of the companion image captured by the second camera 304, as disclosed herein. That is, the depth value determination module 216 may determine which pixel of the companion image captured by the second camera 304 corresponds to each pixel of the training image captured by the first camera 302.

Each pixel of the training image captured by the first camera 302 may represent a particular physical point in the scene 306. Because the first camera 302 and the second camera 304 both capture an image of the same scene 306, the companion image captured by the second camera 304 may also include the same point in the scene 306. As such, each pixel of the training image of the scene 306 captured by the first camera 302 may correspond to a particular pixel of the companion image of the scene 306 captured by the second camera 304. The particular transformation of pixels between images captured by the cameras 302 and 304 depends on the relative camera geometry between the two cameras and the depth of the pixel. Because the relative camera geometry between the cameras 302, 304 is known (as received by the training data reception module 214), the pixel depth can be determined, as disclosed herein.

Figure 4:
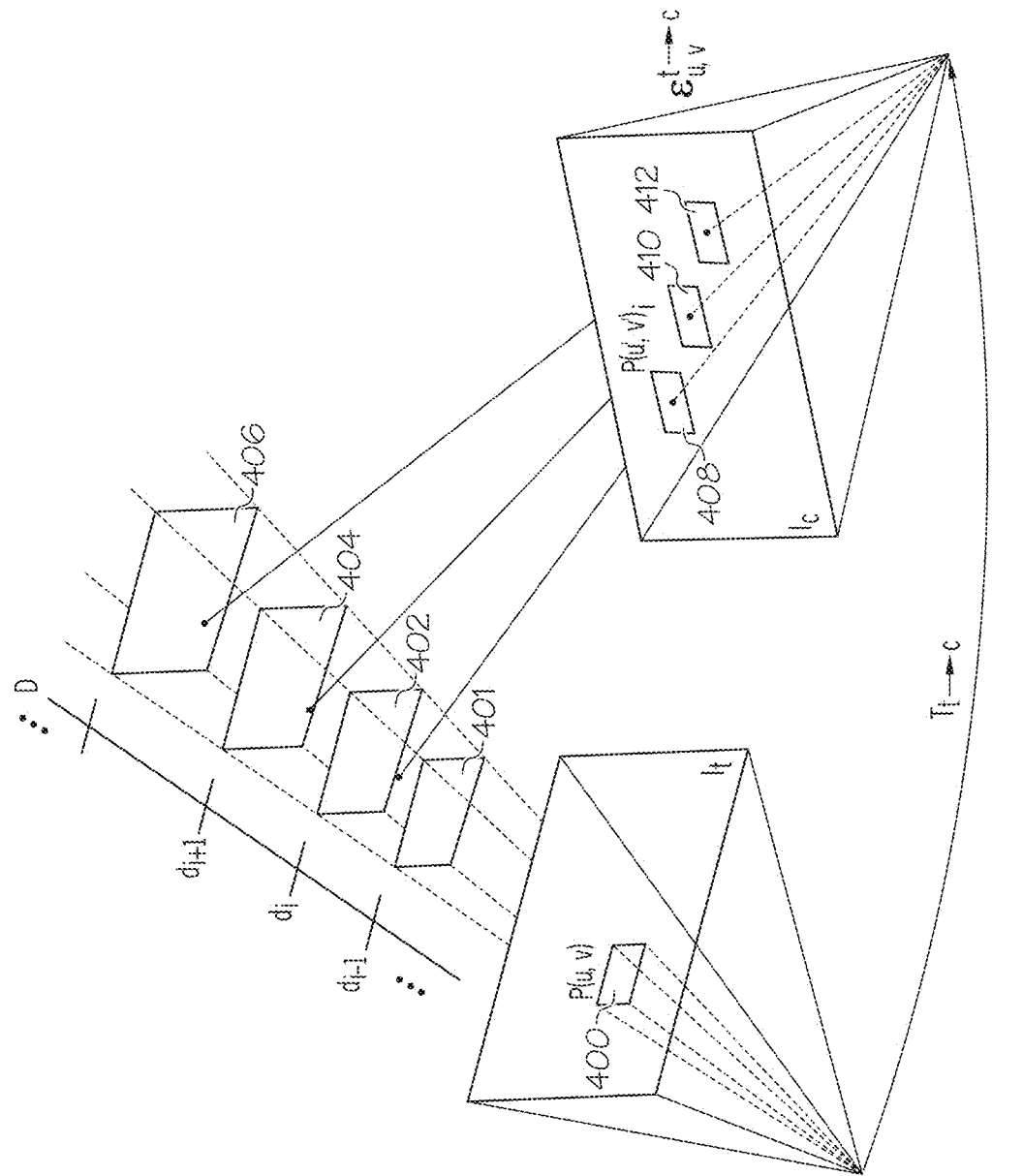
FIG. 4 illustrates determining pixel transformations, according to one or more embodiments shown and described herein.

FIG. 4 shows an example of two images of the scene 306 captured by the cameras 302, 304. The image It of FIG. 4 may be the training image captured by the first camera 302 and the image Ic of FIG. 4 may be the companion image captured by the second camera 304. From just a single image (e.g., the training image It), it may not be possible to determine what the depth values of the pixels in the image are. Accordingly, for each pixel of the training image It, the depth value determination module 216 may generate or sample a plurality of potential depth values for the pixel of the training image and compare the pixel to a corresponding pixel in the companion image for each of the potential depth values, as disclosed herein.

In the example of FIG. 4, any particular pixel of the training image It captured by the first camera 302 may have D potential depth values. For example, 100 potential depth values may be considered. In some examples, the potential depth values may be equally spaced (e.g., 1 m, 2 m, 3 m, . . . , 100 m). In other examples, the potential depth values may be spaced in any other manner (e.g. logarithmically). While 100 potential depth values is given for illustrative purposes, any number of potential depth values may be considered. In some examples, the potential depth values may be specified by a user.

For each potential depth value of a pixel in the training image it captured by the first camera 302, the depth value determination module 216 may determine a corresponding pixel in the companion image Ic captured by the second camera 304 based on the relative camera geometry between the cameras 302, 304. For example, FIG. 4 shows the images It and Ic captured by the first camera 302 and the second camera 304, respectively, as being taken from different perspectives.

In the training image It captured by the first camera 302, a pixel 400 has coordinates (u,v) and an RGB value P(u,v). The point in the scene 306 captured by the pixel 400 has a certain depth value from the first camera 302. Furthermore, the point in the scene 306 captured by the pixel 400 may also be captured by the second camera 304 in a corresponding pixel in the companion image Ic. However, the coordinates of the pixel in the companion image Ic that corresponds to the pixel 400 will likely have different coordinates than (u,v) based on the different perspective of the images It and Ic. In the example of FIG. 4, the coordinates of the pixel in the companion image Ic that corresponds to the pixel 400 in the training image It is (u',v'). In particular, the coordinates (u',v') will lie along a depth-discretized epipolar line $\in_{u,v}^{t \to c}$, where t→c represents a transformation of a pixel from the training image It to the companion image Ic.

In the example of FIG. 4, the pixel 400 in the training image It is shown as having four potential depths represented as 401, 402, 404, and 406. In the example of FIG. 4, only four potential depth values are shown for purposes of illustration. However, it should be understood that in other examples, any number of potential depth values may be used.

In the example of FIG. 4, if the pixel 400 in the training image It has depth 402, then the corresponding pixel in the companion image Ic is pixel 408. If the pixel 400 in the training image It has depth 404, then the corresponding pixel in the companion image Ic is pixel 410. If the pixel 400 in the training image It has depth 406, then the corresponding pixel in the companion image Ic is pixel 412. In particular, the relationship between the coordinates (u,v) of a pixel in the training image It captured by the first camera 302 and the coordinates (u',v') of a pixel in the companion image captured by the second camera 304 depends on the geometric relationship between the cameras 302, 304 and the potential depth value for each pixel. Accordingly, for any, given pixel having particular coordinates in the training image It of the scene 306 captured by the first camera 302, the depth value determination module 216 may determine the coordinates of the corresponding pixel in the companion image Ic of the scene 306 captured by the second camera 304.

After determining a corresponding pixel in the companion image Ic for each pixel and potential depth value in the training image It, the depth value determination module 216 may determine a data matching cost between each pixel and potential depth value in the training image It and the corresponding pixel in the companion image Ic. In the illustrated example, the data matching cost may comprise a difference between the RGB value of the pixel in the training image It captured by the first camera 302 and the RGB value of the corresponding pixel in the companion image Ic captured by the second camera 304. In other examples, the data matching cost may be determined at a feature level. That is, depth value determination module 216 may determine feature values for each pixel of the training image It and the companion image Ic using feature extraction techniques. The depth value determination module 216 may then determine a data matching cost comprising a difference between a feature value of a pixel in the training image It captured by the first camera 302 and a feature value of the corresponding pixel in the companion image Ic captured by the second camera 304.

As discussed above, the depth value determination module 216 may determine a data matching cost for each pixel and potential depth value of the training image It. As discussed above, for a given pixel of the training image It, the depth value determination module 216 may determine a different corresponding pixel in the companion image Ic for each potential depth value. As such, for a given pixel of the training image It, the depth value determination module 216 may determine a different data matching cost for each potential depth value. The depth value determination module 216 may then determine that the most likely depth value for the given pixel is the potential depth value with the lowest data matching cost. That is, the potential depth value with the lowest data matching cost is the best match to the companion image Ic. As such, the depth value determination module 216 may select the potential depth value having the lowest data matching cost as the ground truth depth value, which may be used for supervised learning as discussed in further detail below. The depth value determination module 216 may select the potential depth value having the lowest data matching cost for each pixel of the training image It to determine an estimated depth map for the training image It, which may then be used for supervised learning. The depth value determination module 216 may determine depth maps using this technique for each training image of the training data received by the training data reception module 214.

In some examples, a training image may be associated with multiple companion images of the same scene taken by multiple cameras at different perspectives. In these examples, the depth value determination module 216 may determine a data matching cost for each potential depth value of the training image with respect to each of the companion images and may then combine these individual data matching costs to determine an overall data matching cost for each pixel of the training image. The depth value determination module 216 may then select the potential depth value of each pixel having the lowest overall data matching cost as the ground truth depth value.

Referring back to FIG. 2, the photometric error determination module 218 may determine a photometric error for each pixel of a training image received by the training data reception module 214. As discussed above, the depth value determination module 216 may determine ground truth depth values for the pixels of a training image. However, the depth values determined by the depth value determination module 216 may not be accurate. For example, a training image may have shadows over certain parts of the image, occlusions of certain parts of the image, motion in certain parts of the image, or other features or artifacts that make it more difficult to accurately determine depth values. Accordingly, the photometric error determination module 218 may determine a photometric error for each pixel of a training image, indicating a confidence level of the determined depth value.

In particular, the photometric error determination module may select the data matching cost associated with the ground truth depth value selected by the depth value determination module 216 for each pixel of a training image. As discussed above, each potential depth value of a pixel of a training image will have a data matching cost with a corresponding pixel of a companion image, and the depth value determination module 216 will select the potential depth value having the lowest data matching cost as the ground truth depth value. Thus, the photometric error determination module 218 may select this data matching cost as the photometric error for each pixel of the training image.

By selecting the data matching cost associated with each pixel of the training image as a photometric error, the selected photometric error may indicate an uncertainty level or a confidence level associated with the depth value determined by the depth value determination module 216. In some examples, the photometric error determination module 218 may convert the photometric error into a confidence level, where a lower photometric error corresponds to a higher confidence level. For example, the photometric error determination module 218 may determine the photometric error as a percentage of the depth value and then determine a confidence level between 0 and 1 based on this percentage. For example, if the photometric error is 0 (meaning the RGB value of the training image perfectly matches the RGB value of the companion image), the photometric error determination module 218 may determine a confidence level of 1, and if the photometric error is 100% of the depth value or greater, the photometric error determination module 218 may determine a confidence level of 0. For photometric errors between 0% and 100% of the depth value, the photometric error determination module 218 may determine a confidence value between 0 and 1 based on a linear interpolation. However, in other examples, the photometric error determination module 218 may use other techniques to determine a confidence level based on the determined photometric error.

Referring still to FIG. 2, the model training module 220 may train the neural network maintained by the server 106 using the training data received by the training data reception module 214, the depth values determined by the depth value determination module 216, and the photometric error values determined by the photometric error determination module 218, as disclosed herein.

Figure 5:
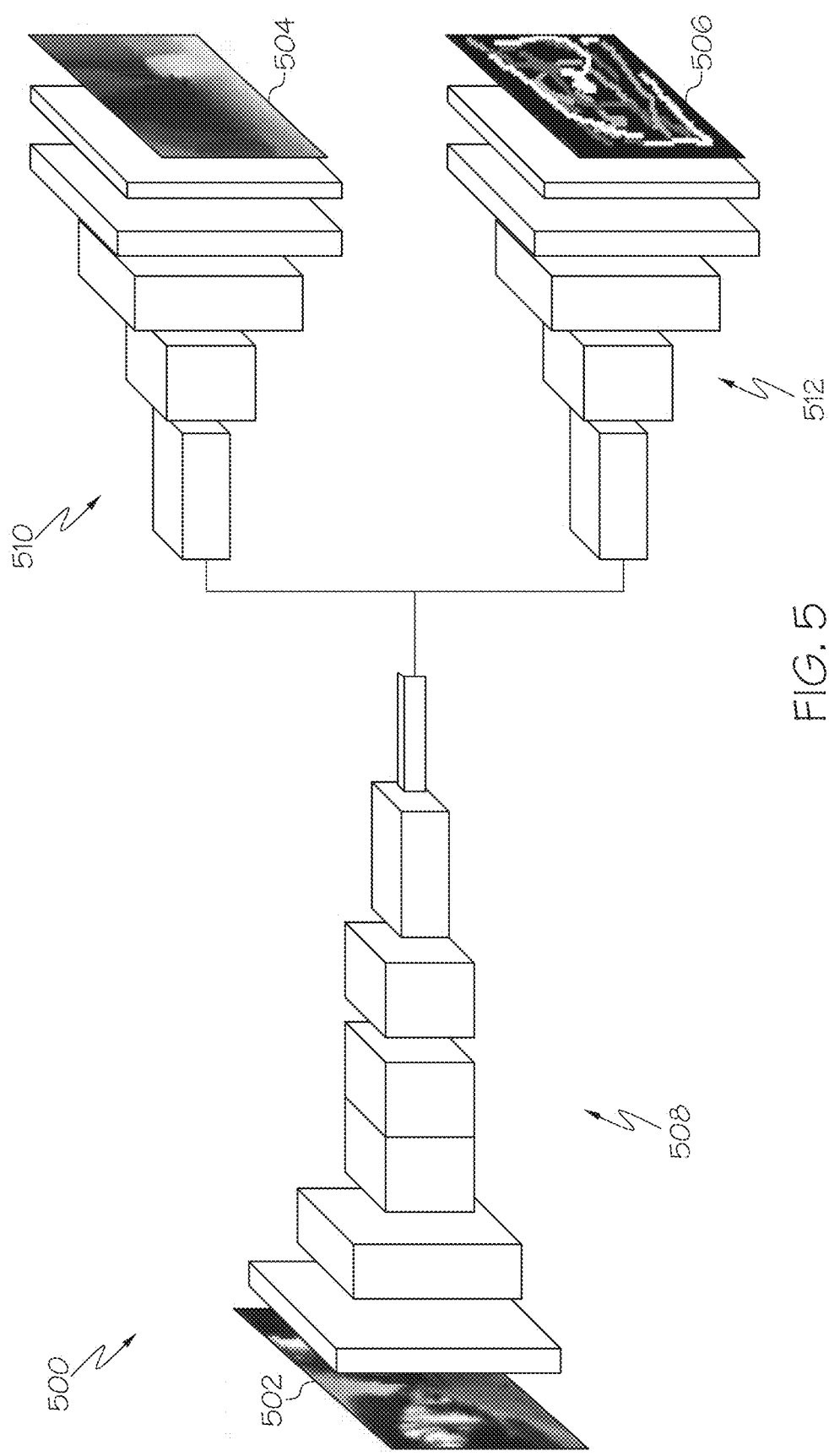
FIG. 5 schematically depicts an architecture of a neural network maintained by the server of FIGS. 1 and 2, according to one or more embodiments shown and described herein.

Turning now to FIG. 5, an example architecture of a neural network 500 maintained by the server 106 is shown. In the example of FIG. 5, the neural network 500 receives a two-dimensional (2D) RGB image 502 as an input and outputs a depth map 504 associated with the image 502 and a confidence level map 506 associated with the image 502. The input image 502 comprises an RGB value for each of a plurality of pixels. The depth map 504 comprises an estimated depth value for each pixel of the image 502. The confidence level map 506 comprises a confidence level for each depth value of the depth map 504. In the example of FIG. 5, the confidence level map 506 is shown as a grayscale image, with the level of grayscale indicating the confidence level of each pixel. However, in other examples, the confidence level map 506 may comprise a matrix representing the confidence level values of the depth map 504 or may be represented in any other manner.

In the example of FIG. 5, the neural network 500 includes an encoder portion 508, a first decoder portion 510, and a second decoder portion 512. The first decoder portion 510 and the second decoder portion 512 may act as two heads of the neural network 500. Each of the encoder portion 508, the first decoder portion 510, and the second decoder portion 512 may comprise a plurality of layers. In the example of FIG. 5, the encoder portion 508 comprises 7 layers and the first decoder portion 510 and the second decoder portion each comprise 5 layers. However, it should be understood that in other examples, the encoder portion 508, the first decoder portion 510, and the second decoder portion 512 may each comprise any number of layers. Furthermore, in some examples, the neural network 500 may include one or more skip connections between one or more layers of the neural network 500 and/or other features or neural network architecture portions.

In the example of FIG. 5, the encoder portion 508 of the neural network 500 comprises a plurality of layers, wherein each layer encodes input values from the previous layer into features. Each layer may have any number of nodes, with each node having parameters that may be trained based on training data. Each layer of the encoder portion 508 may comprise a convolutional layer, a pooling layer, a fully connected layer, or other types of layers. As shown in the example of FIG. 5, each layer of the encoder portion 508 either maintains or increases the number of features from the previous layer, while maintaining or reducing the spatial resolution from the previous layer. The innermost layer of the encoder portion 508 has the greatest number of features but the smallest spatial resolution.

The first decoder portion 510 of the neural network 500 may decode the features determined by the encoder portion 508 to determine the depth map 504. Similar to the encoder portion 508, each layer of the first decoder portion 510 may have any number of nodes, with each node having parameters that may be trained based on training data. Each layer of the first decoder portion 510 may comprise a convolutional layer, a pooling layer, a fully connected layer, or other types of layers. As shown in the example of FIG. 5, each layer of the first decoder portion 510 either maintains or decreases the number of features from the previous layer, while maintaining or increasing the spatial resolution from the previous layer. As such, the spatial resolution of the depth map 504 is the same as the spatial resolution of the input image 502. The last layer of the first decoder portion 510 may output the depth map 504 associated with the input image 502, comprising an estimated depth value for each pixel of the image 502.

The second decoder portion 512 of the neural network 500 may decode the features determined by the encoder portion 508 to determine the confidence level map 506. Similar to the encoder portion 508 and the first decoder portion 510, each layer of the second decoder portion 512 may have any number of nodes, with each node having parameters that may be trained based on training data. Each layer of the second decoder portion 512 may comprise a convolutional layer, a pooling layer, a fully connected layer, or other types of layers. As shown in the example of FIG. 5, each layer of the second decoder portion 512 either maintains or decreases the number of features from the previous layer, while maintaining or increasing the spatial resolution from the previous layer. As such, the spatial resolution of the confidence level map 506 is the same as the spatial resolution of the input image 502. The last layer of the second decoder portion 512 may output the confidence level map 506 associated with the input image 502, comprising a confidence level of each depth value of the depth map 504.

The model training module 220 may train the neural network 500 in an end-to-end manner to estimate the depth map 504 and the confidence level map 506 based on the input image 502. In particular, the model training module 220 may train the neural network 500 using the training data received by the training data reception module 214, the ground truth depth values determined by, the depth value determination module 216, and ground truth photometric error values determined by the photometric error determination module 218. For example, the parameters of the layers of the neural network 500 may be trained to minimize a loss function based on a difference between the values of the depth map 504 and the ground truth depth values determined by the depth value determination module 216, and a difference between the values of the confidence level map 506 and the ground truth photometric errors determined by the photometric error determination module 218 across all of the training images received by the training data reception module 214. The model training module 220 may train the neural network 500 using any optimization method (e.g., gradient descent).

Accordingly, the model training module 220 may train the neural network 500 to output a depth map 504 associated with the input image 502 and photometric error values of the depth values of the depth map 504 based on the training data received by the training data reception module 214. As such, once the neural network 500 is trained, an image with unknown depth values may be input into the trained neural network 500 and the neural network 500 may output an estimated depth map and photometric error values of the estimated depth map for the image.

Referring back to FIG. 2, the image reception module 222 may receive an image for which a depth map is to be estimated using the trained neural network maintained by the server 106 (e.g., the neural network 500). For example, the image reception module 222 may receive an image of the scene 104 captured by the camera 102 in the example of FIG. 1. After the image reception module 222 receives an image, a depth map of the received image may be estimated by the server 106, as disclosed herein.

Referring still to FIG. 2, the depth estimation module 224 may determine an estimated depth map for the image received by the image reception module 222. In particular, the depth estimation module 224 may utilize the neural network maintained by the server 106 (e.g., the neural network 500 of FIG. 5) to determine an estimated depth map associated with the received image. In the illustrated example, the depth estimation module 224 may input the image received by the image reception module 222 into the trained neural network 500 of FIG. 5. The first decoder portion 510 may then output the depth map 504 associated with the input image. The depth estimation module 224 may select the depth map 504 output by the first decoder portion 510 as the estimated depth map for the image received by the image reception module 222.

Referring still to FIG. 2, the confidence level determination module 226 may determine a confidence level for each depth value determined by the depth estimation module 224. In particular, the second decoder portion 512 of the neural network 500 may output a photometric error value for each depth value output by the first decoder portion 510. As such, the confidence level determination module 226 may determine a confidence level for each depth value of the depth map 504 based on the photometric error value output by the second decoder portion 512, as disclosed above. Accordingly, a system may utilize the depth values and confidence levels output by the depth estimation module 224 and the confidence level determination module 226.

Figure 6:
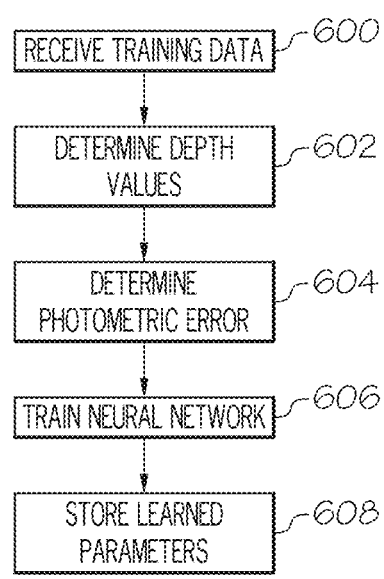
FIG. 6 depicts a flowchart of a method for training the neural network maintained by the server of FIGS. 1 and 2, according to one or more embodiments shown and described herein.

FIG. 6 depicts a flowchart of an example method for training the neural network maintained by the server 106 (e.g., the neural network 500 of FIG. 5). At step 600, the training data reception module 214 receives training data. The training data may comprise a plurality of training examples. Each training example may comprise a training image of a scene captured by a first camera from a first perspective, a companion image of the scene captured by a second camera from a second perspective, and a geometric relationship between the first and second cameras when the first and second images were captured.

At step 602, the depth value determination module 216 determines a depth map for each training image received by the training data reception module 214 based on the received companion images and the received geometric relationships between cameras, using self-supervision. In particular, for each training example, the depth value determination module 216 may define a plurality of potential depth values for each pixel of the training image. For each pixel and potential depth value of the training image, the depth value determination module 216 may determine a corresponding pixel in the companion image based on the geometric relationship between the two cameras that captured the training image and the companion image. The depth value determination module 216 may determine a data matching cost between each pixel and potential depth value of the training image and each corresponding pixel in the companion image. The depth value determination module 216 may select the potential depth value having the lowest data matching cost as the ground truth depth value for each pixel of the training image. The selected ground truth values for each pixel of the training image may comprise the determined depth map for the training image.

At step 604, the photometric error determination module 218 determines a photometric error for each pixel of each training image received by the training data reception module 214. In particular, for each training example, the photometric error determination module 218 may identify the data matching cost of the potential depth value selected by the depth value determination module 216 for each pixel as the photometric error.

At step 606, the model training module 220 trains the neural network 500 based on the training data received by the training data reception module 214, the depth values determined by the depth value determination module 216, and the photometric error determined by the photometric error determination module 218. In particular, the model training module 220 may train the neural network 500 to receive the input image 502 and output the depth map 504 comprising estimated depth values of each pixel of the input image 502 and output a confidence level map 506 comprising confidence levels of each depth value of the depth map 504. The model training module 220 may utilize supervised learning techniques to train the neural network 500 based on the training images received by the training data reception module 214, and using the depth values determined by the depth value determination module 216 and the photometric error values determined by the photometric error determination module 218, as ground truth values.

For example, the model training module 220 may assign random weights to the nodes of the layers of the neural network 500. The model training module 220 may then determine a loss function based on a difference between the ground truth depth values and the depth values output by the first decoder portion 510 and a difference between the ground truth photometric error values and the values of the confidence level map 506 output by the second decoder portion 512. The parameters of the neural network 500 may then be updated using an optimization function (e.g., gradient descent) to minimize the loss function.

At step 608, after the model training module 220 trains the parameters of the neural network 500 to minimize the loss function, the learned parameters may be stored in the database 212.

Figure 7:
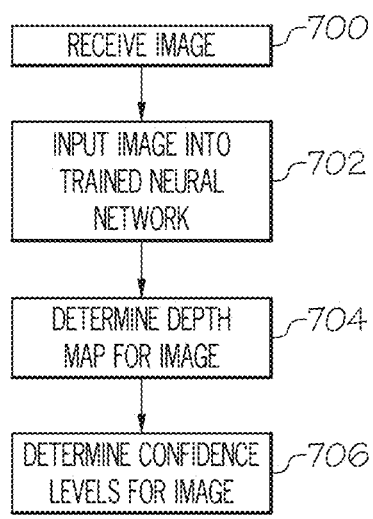
FIG. 7 depicts a flowchart of a method of operating the system of FIGS. 1 and 2, according to one or more embodiments shown and described herein.

FIG. 7 depicts a flowchart of an example method for operating the server 106 to determine an estimated depth map and confidence levels for an input image. At step 700, the image reception module 222 receives an input image. For example, the image reception module 222 may receive an RUB image of the scene 104 captured by the camera 102.

At step 702, the depth estimation module 224 inputs the image received by the image reception module 222 into the neural network maintained by the server 106. For example, the depth estimation module 224 may input the image into the trained neural network 500 of FIG. 5. The first decoder portion 510 of the neural network 500 may then output the depth map 504 comprising estimated depth values of the image, and the second decoder portion 512 of the neural network 500 may output the confidence level map 506 comprising confidence level values of the depth values of the depth map 504.

At step 704, the depth estimation module 224 determines estimated depth values for the image received by the image reception module 222. In particular, the depth estimation module 224 may select the depth values of the depth map 504 output by the first decoder portion 510 of the neural network 500 as the estimated depth values for the pixels of the image received by the image reception module 222.

At step 706, the confidence level determination module 226 determines a confidence level for each depth value determined by the depth estimation module 224. In particular, the confidence level determination module 226 may determine a confidence level for each depth value determined by the depth estimation module 224 based on the values of the confidence level map 506 output by the second decoder portion 512 of the neural network 500.

It should now be understood that embodiments described herein are directed to learning photometric error as a measure of uncertainty. A neural network may be trained to output depth values and confidence level values for pixels of an input image. The neural network may be trained using training examples comprising pairs of images. Each pair of images may be an image of a scene captured from a different perspective by cameras having a known geometric relationship. Self-supervision may be used to determine ground truth depth values and ground truth photometric error for each training example based on the pair of images and the known geometric relationship between them.

Once ground truth values are determined for depth and photometric error, the neural network may be trained utilizing supervised learning techniques, using the receiving training data and the determined ground truth values. After the neural network is trained, an image may be input into the trained neural network, which may output a depth map and confidence levels for the depth values of the depth map associated with the image. A downstream system may utilize the depth map for making decisions and performing operations and may also take into account the confidence levels of the depth values when deciding how much weight to give to the determined depth values.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving a plurality of training examples, each training example comprising a first image of a scene captured by a first camera, a second image of the scene captured by a second camera from a different perspective than the first camera, and a photometric error for each pixel of the first image;
   for each training example, defining a plurality of potential depth values for each pixel of the first image;
   for each pixel and potential depth value of the first image, determining a corresponding pixel in the second image based on a geometric relationship between the first camera and the second camera;
   determining a data matching cost between each pixel and potential depth value of the first image and each corresponding pixel in the second image;
   selecting the potential depth value having a lowest data matching cost as a ground truth depth value for each pixel of the training image;
   training a neural network to produce an estimated depth map for an input image as a first output and a confidence level for each pixel of the depth map as a second output based on the training examples and the determined ground truth values;
   receiving a third image of the scene;
   inputting the third image into the trained neural network;
   determining an estimated depth map for the third image based on the first output of the trained neural network, the estimated depth map comprising a depth value for each pixel of the image; and
   determining a confidence level of the depth value for each pixel of the image based on the second output of the trained neural network.

2. The method of claim 1, wherein the neural network comprises a convolutional neural network.

3. The method of claim 1, wherein the neural network comprises an encoder-decoder architecture comprising an encoder portion, a first decoder portion, and a second decoder portion.

4. The method of claim 3, wherein the first output of the neural network is based on an output of the first decoder portion and the second output of the neural network is based on an output of the second decoder portion.

5. The method of claim 1, further comprising training the neural network using supervised learning to produce the first output and the second output.

6. The method of claim 1, further comprising training the neural network to generate the second output based on the photometric error for each pixel of the first image of each training example.

7. The method of claim 1, further comprising, for each training example:
determining the geometric relationship between the first camera and the second camera with respect to the scene.

8. The method of claim 1, wherein the data matching cost is based on a difference between a first RGB value of each pixel of the first image and second RGB value of each corresponding pixel in the second image.

9. The method of claim 1, further comprising, for each training example, selecting the data matching cost as the photometric error.

10. A computing device comprising a controller programmed to:
receive a plurality of training examples, each training example comprising a first image of a scene captured by a first camera, a second image of the scene captured by a second camera from a different perspective than the first camera, and a photometric error for each pixel of the first image;
for each training example, define a plurality of potential depth values for each pixel of the first image;
for each pixel and potential depth value of the first image, determine a corresponding pixel in the second image based on a geometric relationship between the first camera and the second camera;
determine a data matching cost between each pixel and potential depth value of the first image and each corresponding pixel in the second image;
select the potential depth value having a lowest data matching cost as a ground truth depth value for each pixel of the training image;
train a neural network to produce an estimated depth map for an input image as a first output and a confidence level for each pixel of the depth map as a second output based on the training examples and the determined ground truth values;
receive a third image of the scene;
input the third image into the trained neural network;
determine an estimated depth map for the third image based on the first output of the trained neural network, the estimated depth map comprising a depth value for each pixel of the image; and
determine a confidence level of the depth value for each pixel of the image based on the second output of the trained neural network.

11. The computing device of claim 10, wherein the neural network comprises an encoder-decoder architecture comprising an encoder portion, a first decoder portion, and a second decoder portion.

12. The computing device of claim 11, wherein the first output of the neural network is based on an output of the first decoder portion and the second output of the neural network is based on an output of the second decoder portion.

13. The computing device of claim 10, wherein the controller is further programmed to train the neural network using supervised learning to produce the first output and the second output.

14. The computing device of claim 10, wherein the controller is further programmed to train the neural network to generate the second output based on the photometric error for each pixel of the first image of each training example.

15. The computing device of claim 10, wherein the controller is further programmed to, for each training example:
determine the geometric relationship between the first camera and the second camera with respect to the scene.

16. The computing device of claim 10, wherein the data matching cost is based on a difference between a first RGB value of each pixel of the first image and second RGB value of each corresponding pixel in the second image.

17. The computing device of claim 10, wherein the controller is further programmed to, for each training example, select the data matching cost as the photometric error.

* * * * *